(12) United States Patent  (10) Patent No.: US 6,880,938 B2
Nakano  (45) Date of Patent: Apr. 19, 2005

(54) PROJECTOR

(75) Inventor: Hirohisa Nakano, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/347,259

(22) Filed: Jan. 21, 2003

(65) Prior Publication Data

US 2003/0174289 A1 Sep. 18, 2003

(30) Foreign Application Priority Data

Jan. 23, 2002 (JP) ........................................ 2002-014826

(51) Int. Cl.$^7$ .......................... G03B 21/22; G03B 21/00
(52) U.S. Cl. ..................................... 353/119; 353/122
(58) Field of Search ................................ 348/794, 818, 348/820, 908; 353/87, 52, 56, 57, 58, 59, 60, 61, 85, 119, 122, 31, 33, 34, 37

(56) References Cited

U.S. PATENT DOCUMENTS

| | | | | |
|---|---|---|---|---|
| 5,806,952 | A | * | 9/1998 | Fujimori ..................... 353/119 |
| 6,520,648 | B1 | * | 2/2003 | Stark et al. .................... 353/85 |
| 6,592,226 | B1 | * | 7/2003 | Fujimori ...................... 353/31 |
| 2003/0020884 | A1 | * | 1/2003 | Okada et al. ................. 353/57 |
| 2003/0137640 | A1 | * | 7/2003 | Nakano et al. ............... 353/57 |
| 2003/0174288 | A1 | * | 9/2003 | Nakano ....................... 353/31 |

FOREIGN PATENT DOCUMENTS

JP   A 8-304739   11/1996

* cited by examiner

Primary Examiner—Judy Nguyen
Assistant Examiner—Andrew Sever
(74) Attorney, Agent, or Firm—Oliff & Berridge PLC

(57) ABSTRACT

A projector according to the present invention is capable of simplifying a shield structure, sufficiently avoiding electromagnetic interference and reducing size thereof by highly densely installing the components thereof, the projector having a power source block (31) having a power source board (31B) installed with a transformer, a converter for converting an output of the transformer etc., the power source board (31B) being accommodated in a case member (31A) composed of metal for shielding electromagnetic wave from the installed circuit components, where a lower shield (33) is disposed to cover the case member (31A), the lower shield (33) having a support portion (31C) projecting upward from four corners on the upper side thereof and a light source driving block fixing portion (31F) extending downward from a front portion thereof, the support portion (31C) supporting a control board (5), the light source driving block fixing portion (32) fixing a light source driving block (32).

5 Claims, 12 Drawing Sheets

PROJECTOR

BACKGROUND OF THE INVENTION

1. Field of the Invention

The present invention relates to a projector having an electric optical device for modulating a light beam irradiated by a light source in accordance with image information.

2. Description of Related Art

Conventionally, a projector has been used for presentation at a conference, scientific society and exhibition. Such projector forms an optical image by modulating a light beam irradiated by a light source with an optical modulator in accordance with image information to enlarge and project the optical image. The projector therefore has a driving circuit for driving the light source, a control board for controlling the optical modulator, and a power source for supplying electric power to the driving circuit and the control board.

Enhancement in the luminance of the light source for improving performance and size reduction for improving portability are desired for such projector.

However, since a light source driving block including the light source driving circuit has a transforming coil for transforming the voltage from an external power source into a predetermined voltage, a capacitor for storing electric power, resistor etc., the light source driving block is likely to be a noise source of electromagnetic failure, which especially influences on a control block for controlling an electric optical device.

The light source driving block and the control block may be partitioned by a shield plate or the distance between the light source driving block and the control block may be widened. However, such arrangement hinders the size reduction of the projector.

SUMMARY OF THE INVENTION

An object of the present invention is to provide a projector capable of reducing the influence of electromagnetic wave radiated from a light source driving block to a control block and simplifying the structure of shielding structure.

A projector according to an aspect of the present invention includes: an electric optical device that modulates a light beam irradiated by a light source in accordance with image information; a light source driving block that drives the light source; a control block that controls the electric optical device; and a power source block that supplies electric power to the light source driving block and the control block, where the light source driving block, the control block, and the power source block are disposed in order of the control block, the power source block and the light source driving block.

Recently, in order to improve performance of a projector, the luminance of light source is enhanced, and the electric power supplied from a light source driving block to the light source increases in accordance therewith, so that electromagnetic wave causing electromagnetic failure is likely to be radiated from the light source driving block.

Especially, since circuit elements such as IC and LSI are highly densely installed on the control block for controlling an electric optical device, the control block is likely to be influenced by noise caused by the electromagnetic wave radiated from the light source driving block.

According to the present invention, since the light source driving block, the control block and the power source block are provided and the components are disposed in order of the control block, the power source block and the light source driving block, when the power source block interposed between the control block and the light source driving block is electromagnetically shielded by the shield, the electromagnetic wave from the power source block can be shielded and, at the same time, the electromagnetic wave from the light source driving block to the power source block and the control block can be shielded. Accordingly, it is not necessary to locate the shield to surround the power source block and the light source driving block, thereby simplifying the shield structure and reducing the size of the projector.

Since the power source block is interposed between the control block and the light source driving block, the electromagnetic wave radiated from the light source driving block can be shielded by the power source block, so that the electromagnetic wave radiated by the light source driving block is not received by the control block, thereby avoiding disturbance of the projected image and malfunction.

Therefore, the shield structure can be simplified while sufficiently avoiding electromagnetic failure of the control block caused by the light source driving block, to achieve an object of the present invention.

In the projector of the present invention, the control block, the power source block and the light source driving block may preferably be superposed in thickness direction of the projector.

According to the above arrangement, since the control block, the power source block and the light source driving block are superposed in the thickness direction of the projector, the components can be installed inside the projector with high density and the space inside the projector can be efficiently utilized, thereby reducing thickness and size of the projector.

In the projector of the present invention, the control block may preferably be a rectangular plate-shaped control board, the light source driving block may preferably be disposed at a first end of the control board and an input signal terminal for the image information to be inputted may preferably be provided on a second end of the control board opposite to the first end.

Usually an interface board installed with a terminal to be connected with, external device is provided on a projector. A signal processing circuit for processing the image signal inputted from the external device is installed on the board. When outside noise is received by the signal processing circuit, the image is distorted and vivid image cannot be displayed.

Since the control block is formed as a rectangular plate-shaped control board, the light source driving block being disposed at a first end of the control board and an input signal terminal for the image information to be inputted from the outside being provided on the second end opposing to the first end, a predetermined distance can be secured between the light source driving block and the interface board to be connected to the external device, thus avoiding electromagnetic interference on the signal processing circuit of the board by the electromagnetic wave radiated by the light source driving block. Accordingly, vivid image without image distortion can be projected.

Further, since the signal terminal is usually made of metal and projected from the board, the signal terminal works as an antenna likely to be influenced by the external electromagnetic wave. By securing a predetermined distance between the signal terminal and the light source driving block radiating the electromagnetic wave, the signal terminal does not work as an antenna, thereby avoiding influence on the inputted image signal and secondary radiation from the signal terminal.

In the projector according to the present invention, a metal shield frame that supports and space out the control block, the power source block and the light source driving block may preferably provided.

According to the above arrangement, since a metal shield frame that supports and space out the control block, the power source block and the light source driving block is provided, mutual interference of the electromagnetic wave radiated by the control block, the power source block and the light source driving block can be prevented, thereby avoiding electromagnetic interference between the respective components.

Further, since the metal shield frame supports the control block, the power source block and the light source driving block so that the components are spaced apart, the power source block and the control block and the light source driving block can be integrated and installed with high density.

Accordingly, the shield structure of the control block, the power source block and the light source driving block can be simplified and the electromagnetic interference between the respective components can be prevented, thus installing the respective components with high density.

In the projector according to the present invention, the light source driving block may preferably include a tube-shaped shield member that covers a circuit element of the light source driving block.

Usually, the light source driving block for driving a light source is provided with heating elements such as a transforming coil for transforming voltage from a power source to a predetermined voltage, a capacitor for storing electric power and resistor.

Since the light source driving block is covered with a tube-shaped shield member, cooling air can be introduced into the shield by employing cooling air from a normal air-cooling fan, thus efficiently cooling the light source driving block to prevent deterioration of the heating elements.

Further, since the light source driving block is covered with a tube-shaped shield member, even when electromagnetic wave radiated by the light source driving block increases in accordance with enhancing the luminance of the light source, the electromagnetic wave can be shielded so as not to be leaked toward the outside, thus avoiding electromagnetic interference on, especially, the other electronics located outside of the projector.

DETAILED DESCRIPTION OF PREFERRED EMBODIMENT(S)

An embodiment of the present invention will be described below with reference to the attached drawings.

[1. Primary Arrangement of Projector]

Figure 1:
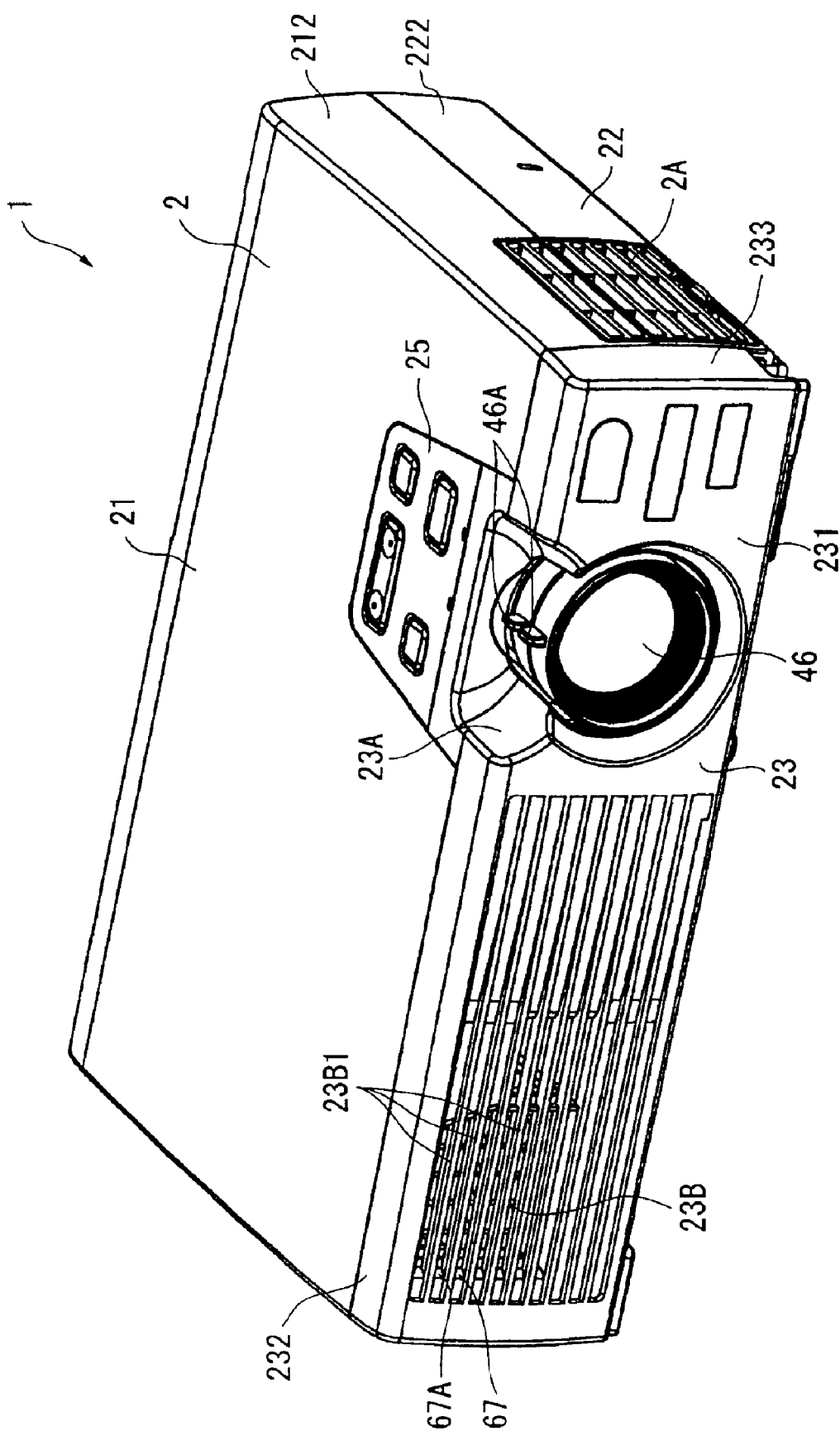
FIG. 1 is an entire perspective view of a projector seen from above according to an embodiment of the present invention.
Figure 2:
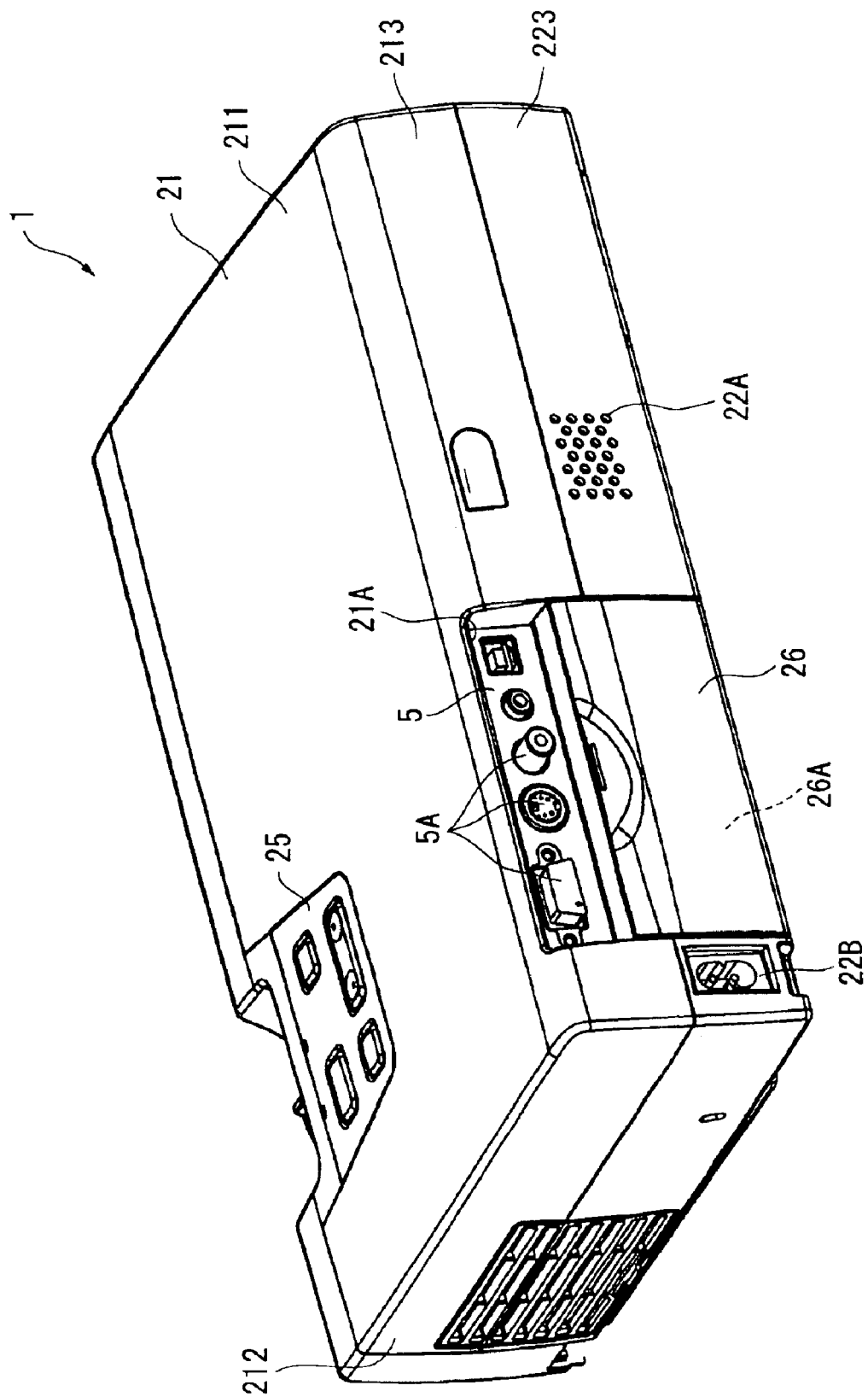
FIG. 2 is an entire perspective view of the projector seen from back side according to the aforesaid embodiment.
Figure 3:
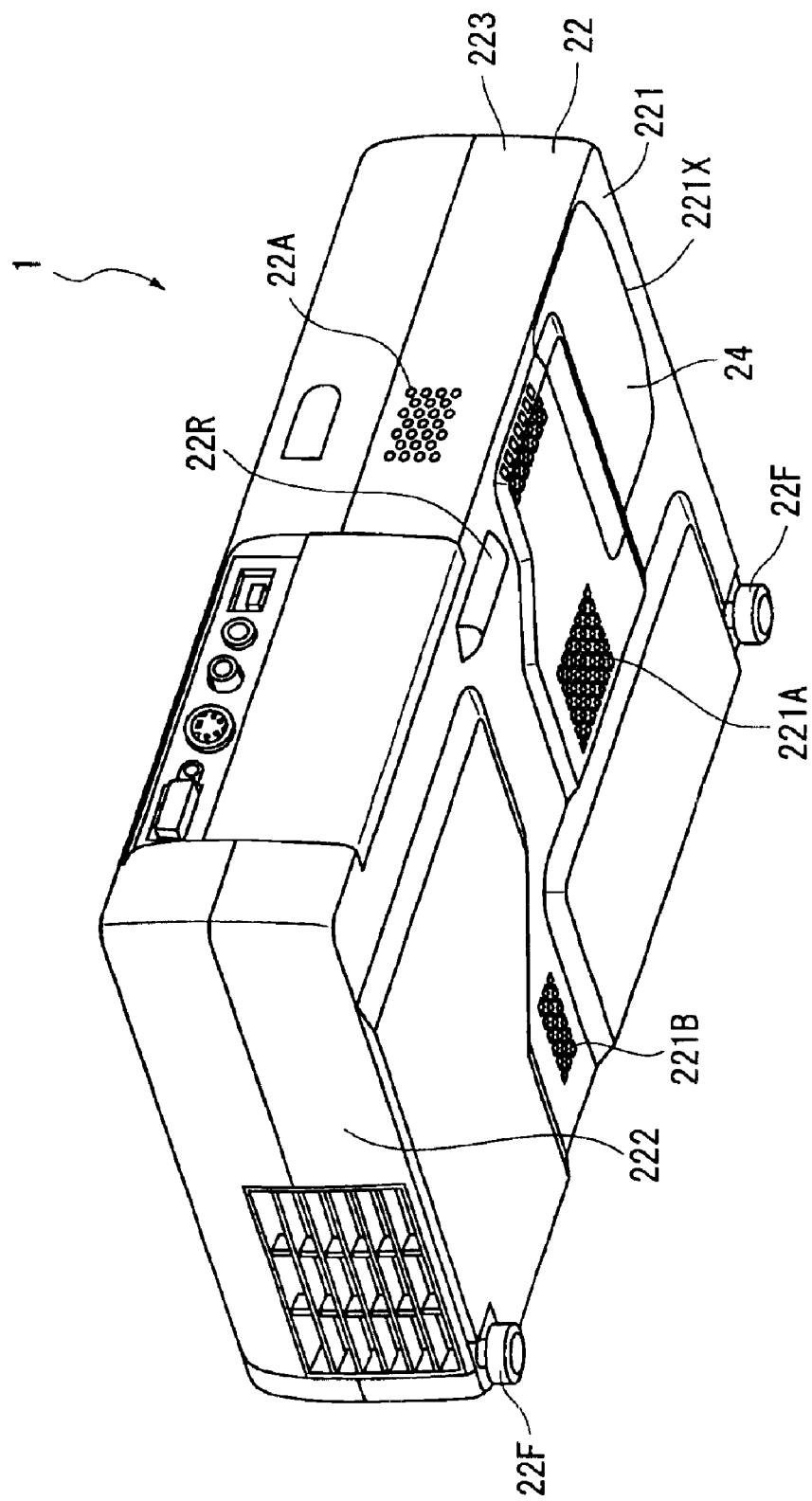
FIG. 3 is an entire perspective view of the projector seen from below according to the aforesaid embodiment.

FIG. 1 is a perspective view of a projector 1 seen from above according to an embodiment of the present invention. FIG. 2 is a perspective view of the projector 1 seen from back side. FIG. 3 is a perspective view of the projector 1 seen from below.

As shown in FIGS. 1 to 3, the projector 1 has an exterior case 2 of approximately rectangular parallelepiped.

The exterior case 2 is a casing for accommodating a body of the projector 1, which includes an upper case 21, a lower case 22 and a front case 23 spanning over the front side of the cases 21 and 22. The cases 21 to 23 are respectively made of synthetic resin material.

As shown in FIG. 2, the upper case 21 includes an upper portion 211, a side portion 212 and a rear portion 213 respectively constituting the top side, lateral side and rear side of the projector 1.

An operation panel 25 is provided on the front side of the upper portion 211.

A recess 21A spanning over the rear side of the upper portion 211 and the rear portion 213 is formed on the back side of the operation panel 25 on the upper case 21. A part of a control board 5 accommodated in the exterior case 2 is exposed to the outside from the recess 21A. The part of the control board 5 exposed to the outside is various connectors 5A constituting an interface. External devices are connected to the projector 1 through the connectors 5A.

As shown in FIG. 3, the lower case 22 includes a bottom portion 221, a side portion 222 and a rear portion 223 respectively constituting the bottom side, lateral side and rear side of the projector 1.

An opening 221X is formed on the bottom portion 221. A lamp cover 24 fitted to the rectangular opening 221X in a detachable manner. Further, inlet holes 221A and 221B for inhaling the cooling air from the outside are formed on the bottom portion 221.

A rear leg 22R constituting one of the legs of the projector 1 is formed approximately at the center on the rear side of the bottom portion 221. Further, front legs 22F also constituting the legs of the projector 1 are respectively provided on the right and left corners on the front side of the bottom portion 221. In other words, the projector 1 is supported on three points by the rear leg 22R and the two front legs 22F.

The two front legs 22F are vertically advanceable and retractable for adjusting the tilting (attitude of the projector 1) in front and rear directions and right and left directions to adjust position of the projected image.

As shown in FIG. 2, a remote controller storage 26 is formed on the rear portion 223 under the connector 5A. A remote controller 26A for remotely operating the projector 1 is accommodated in the remote controller storage 26.

Further, in FIG. 2, a speaker hole 22A is formed on the right of the remote controller storage 26 on the rear portion 223 and an inlet connector 22B is provided on the left of the remote controller storage 26.

As shown in FIG. 1, the front case 23 includes a front portion 231, a top portion 232 and a side portion 233 respectively constituting the front side, top side and lateral side of the projector 1.

An opening 23A spanning over the front portion 231 and the top portion 232 is formed on the front case 23. A projection lens 46 is disposed inside the exterior case 2 corresponding to the opening 23A. A part of the projection lens 46 is exposed to the outside from the opening 23A, so that zooming operation and focusing operation of the projection lens 46 can be manually conducted through a lever 46A as a part of the exposed portion.

An exhaust hole 23B is formed on the front portion 231 on a side opposite to the opening 23A. A plurality of horizontally arranged vanes 23B1 are formed on the exhaust hole 23B, the vanes 23B1 regulating the cooling air discharged from the exhaust hole of an exhaust duct 6B and blocking the light from the inside and the outside.

As shown in FIG. 1, an inlet hole 2A spanning over the side portion 212 of the upper case 21 and the side portion 222 of the lower case 22 is formed on the lateral side of the exterior case 2. A sirocco fun not illustrated in FIGS. 1 to 3 is provided inside the inlet hole 2A.

Figure 4:
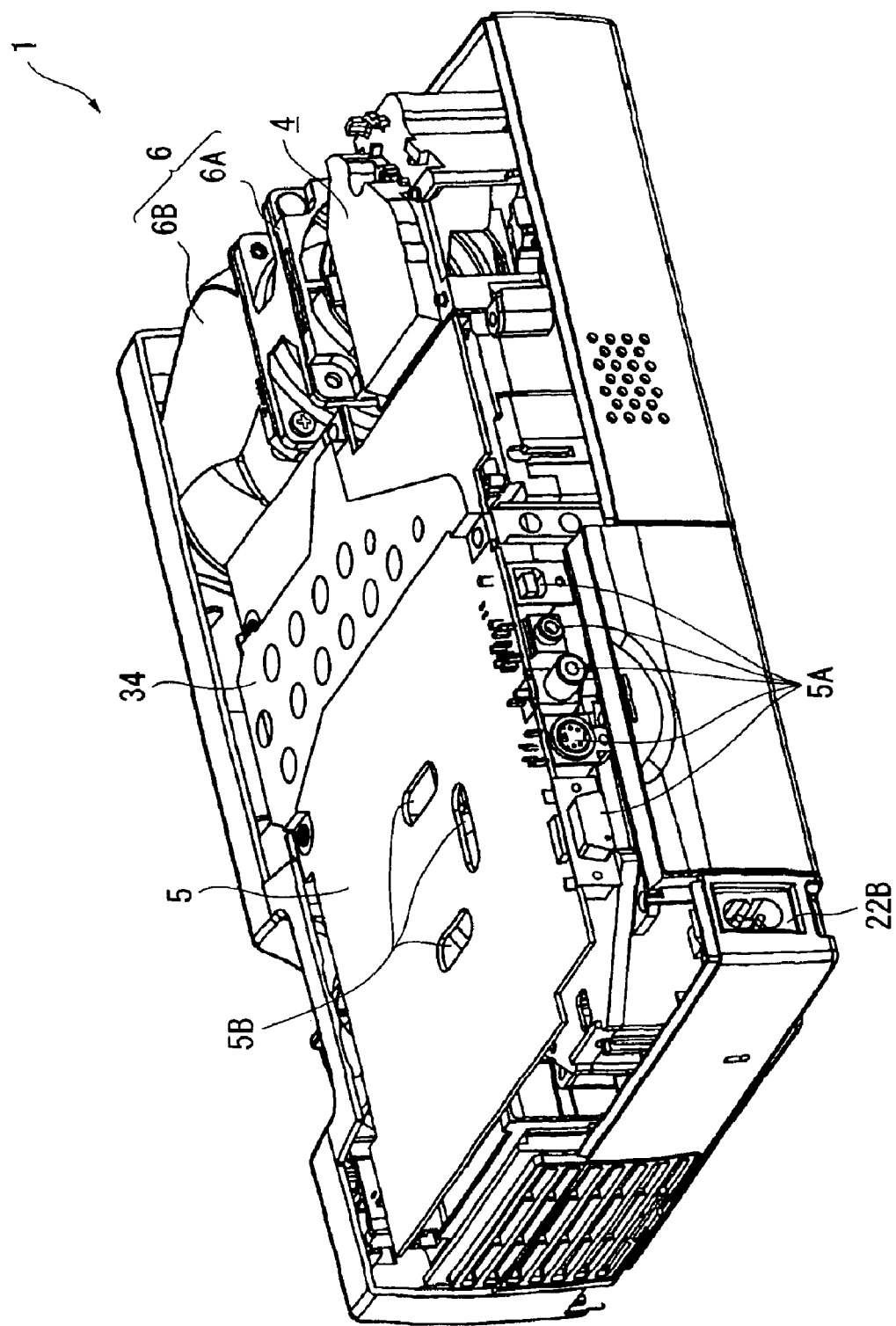
FIG. 4 is a perspective view showing the inside of the projector according to the aforesaid embodiment, which specifically shows the projector with upper case thereof being removed from the condition shown in FIG. 2.
Figure 5:
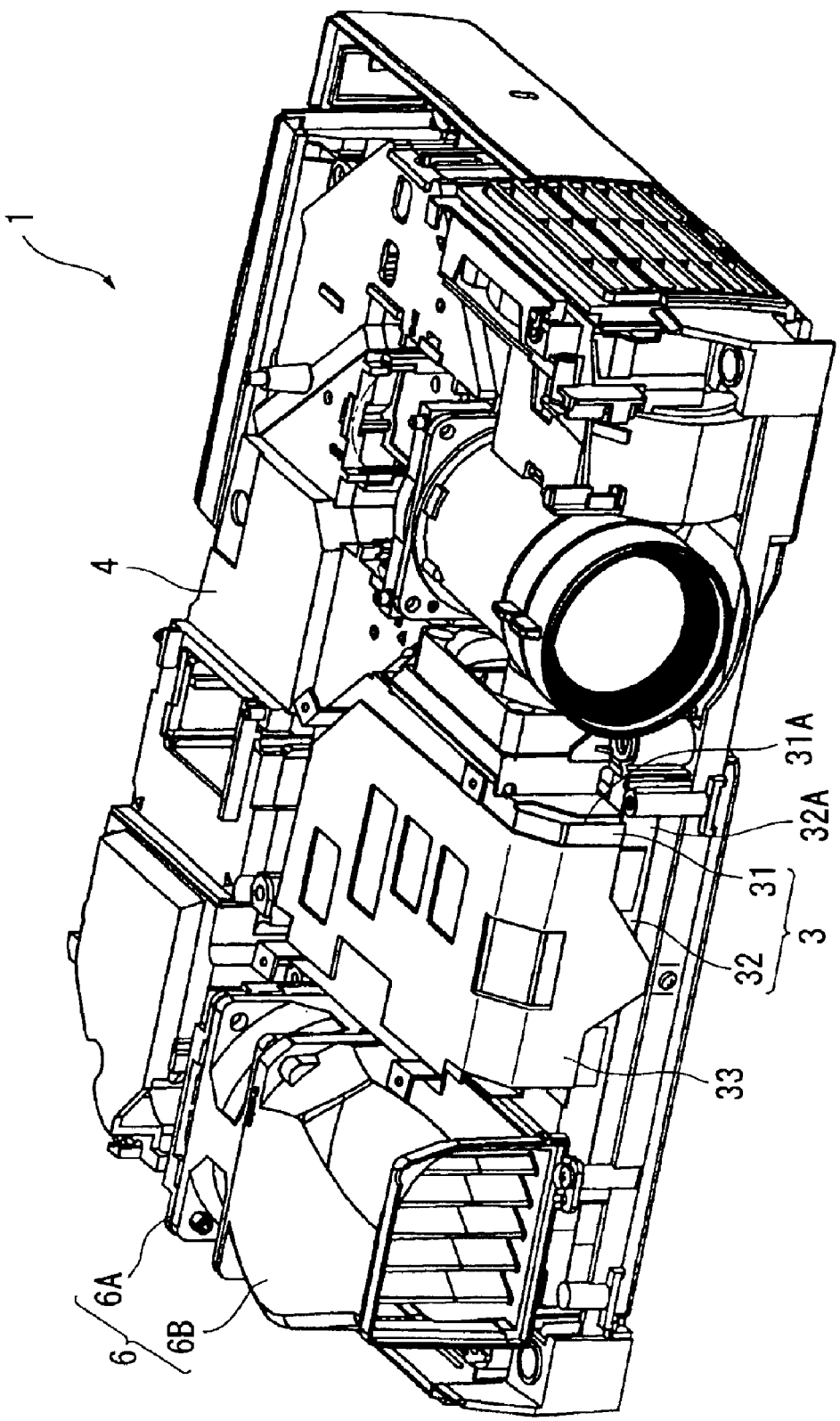
FIG. 5 is a perspective view showing the inside of the projector according to the aforesaid embodiment, which specifically shows the projector seen from front side with upper shield plate and control board thereof being removed from the condition shown in FIG. 4.

FIGS. 4 and 5 are perspective views showing the inside of the projector 1.

Specifically, FIG. 4 is an illustration where the upper case 21 of the projector 1 is removed from the condition shown in FIG. 2. FIG. 5 is an illustration seen from the front side where the front case 23, an upper shield 34, and a control board 5 are removed from the condition shown in FIG. 4.

As shown in FIG. 4 or 5, the exterior case 2 is provided with a power source unit 3 disposed at approximately center of the front side of the projector 1, an optical unit 4 having approximately planarly-viewed L-shape disposed on the rear side and right side of the power source unit 3, the control board 5 disposed above the units 3 and 4, and an exhaust duct unit 6 disposed on an end of the optical unit 4 toward the front side.

The power source unit 3 includes a power source block 31 and a lamp driving block (ballast) 32 disposed below the power source block 31.

The power source block 31 supplies the electric power from the outside to the light source driving block 32, the control board 5 etc. through a not-illustrated power cable connected to the inlet connector 22B.

The light source driving block 32 supplies electric power fed-by the power source block 31 to a light source lamp (not shown in FIGS. 4 and 5) constituting the optical unit 4, which is electrically connected to the light source lamp. The light source driving block 32 is, for instance, wired to a not-illustrated board.

The power source block 31 and the light source driving block 32 are vertically arranged approximately in parallel, which occupy the space extending in right and left direction on the front side of the projector 1.

The power source block 31 and the light source driving block 32 are respectively covered with case members 31A and 32A having right and left sides being opened, the surface of the case members 31A and 32A being processed by plating, metal vacuum evaporation, foliation etc. The case members 31A and 32A prevent leakage of electromagnetic noise between the power source block 31 and the light source driving block 32 and works as a duct for introducing the cooling air.

The power source block 31 and the light source driving block 32 are covered with a metal lower shield 33 having rectangular opening, so that electromagnetic noise from the power source block 31 and the light source driving block 32 toward the outside can be prevented.

Figure 6:
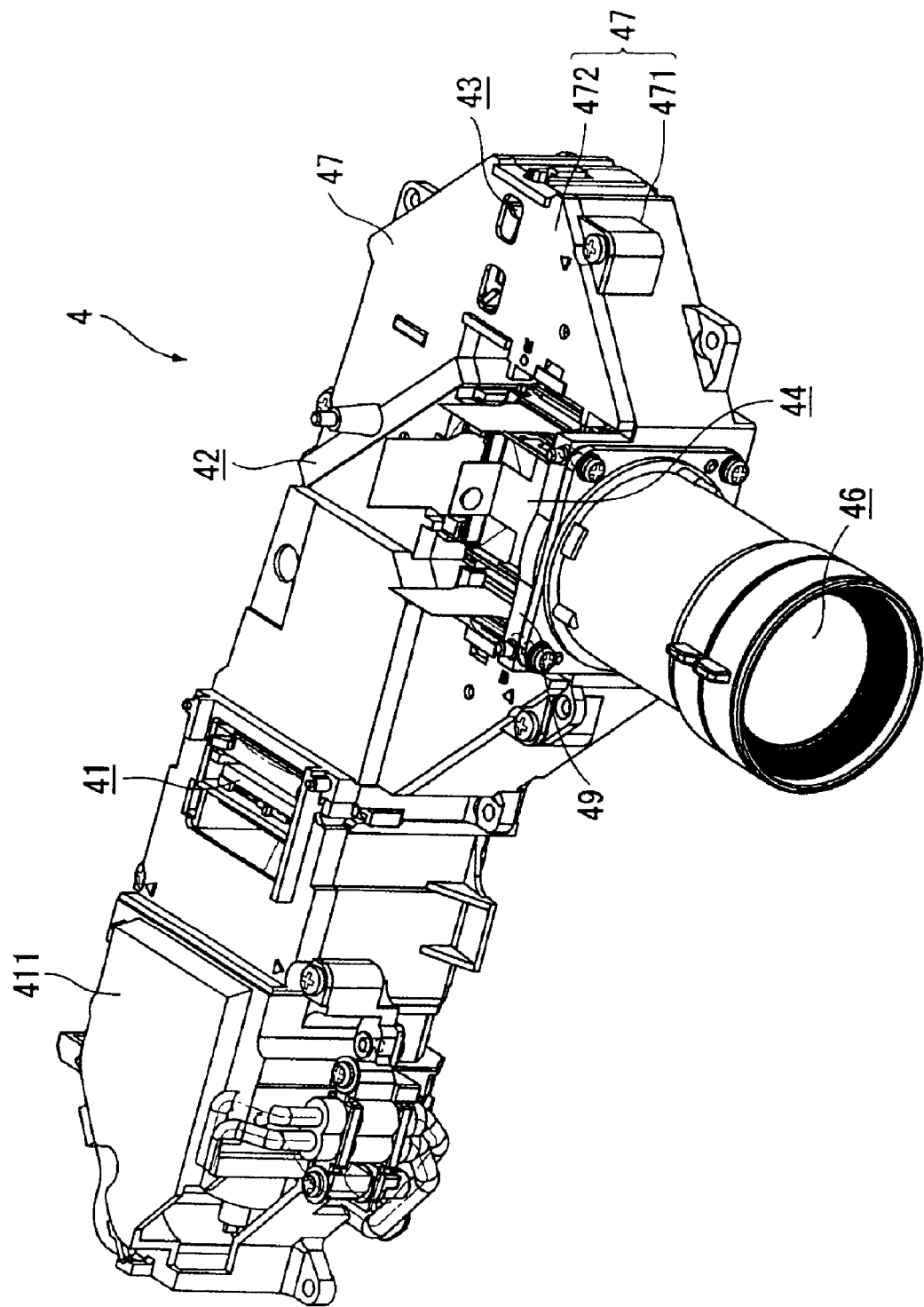
FIG. 6 is a perspective view showing an optical unit seen from above according to the aforesaid embodiment.

FIG. 6 is a perspective view showing an optical unit 4.

As shown in FIG. 6, the optical unit 4 optically processes the light beam irradiated by the non-illustrated light source lamp constituting a light source 411 to form an optical image in accordance with image information and enlarges and projects the optical image, which includes an integrator illuminating optical system 41, a color separating optical system 42, a relay optical system 42, an optical device 44, the projection lens 46 and a light guide 47 for accommodating the optical components 41 to 46. The details of the optical unit 4 will be described below.

Though not specifically shown in FIG. 4, the control board 5 is a single substrate installed with a controller including a CPU etc. and an interface including the various connectors 5A as a connection terminal, in which the controller controls the liquid crystal panel constituting the optical device 44 in accordance with the image information inputted through the connector 5A.

As shown in FIGS. 4 and 5, the control board 5 is provided on the upper side of the lower shield 33. Further the metallic upper shield 34 is disposed above the control board 5. The upper shield 34 and the lower shield 33 are mutually fixed with the control board 5 sandwiched therebetween. Accordingly, the leakage of the electromagnetic noise from the power source unit 3 and the control board 5 toward the outside can be prevented.

As shown in FIG. 4 or 5, the exhaust duct unit 6 exhausts the air staying within inside the projector 1 to the outside of the projector 1, which includes an axial-flow fan 6A and the exhaust duct 6B.

[2. Details of Optical Unit]

Figure 7:
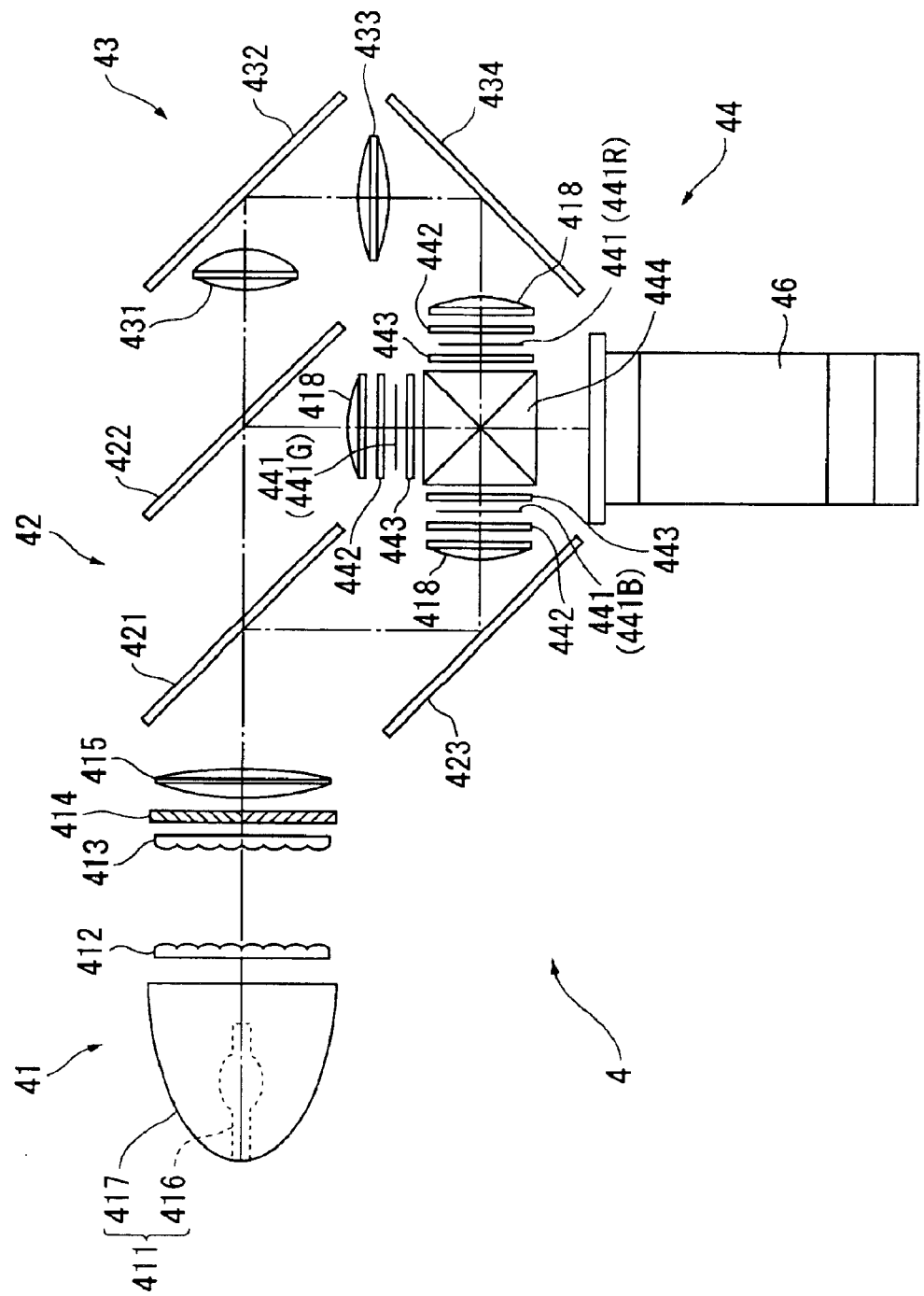
FIG. 7 is a plan view schematically showing an optical unit according to the aforesaid embodiment.

FIG. 7 is a plan view schematically showing the optical unit 4 shown in FIG. 6.

As shown in FIG. 7, the optical unit 4 includes the integrator illuminating optical system 41, the color separating optical system 42, the relay optical system 43, the optical device 44 and the projection lens 46 as a projection optical system.

The integrator illuminating optical system 41 is a system for substantially uniformly illuminating the image formation area of the three liquid crystal panels 441 constituting the optical device 44 (respectively referred to as liquid crystal panel 441R, 441G and 441B for every color lights of red, green and blue), which includes a light source 411, a first lens array 412, a second lens array 413, a polarization converter 414 and a superposing lens 415.

The light source 411 has a light source lamp 416 as a radiation light source and a reflector 417, which changes the radial light beam irradiated by the light source lamp 416 into a parallel light beam by the reflector 417 to emit the parallel light beam toward the outside.

A halogen lamp is used as the light source lamp 416. Incidentally, metal halide lamp and a high-pressure mercury lamp etc. may be used instead of the halogen lamp.

A parabolic mirror is used as the reflector 417. Incidentally, a combination of parallelizing concave lens and ellipsoidal mirror may be used instead of the parabolic mirror.

The first lens array 412 is a plurality of small lenses arranged in matrix, the lenses having substantially rectangular profile viewed from optical axis direction. The respective lenses split the beam emitted from the light source lamp 416 into a plurality of sub-beams. The profile of the respective lenses is approximately similar to the configuration of the image formation area of the liquid crystal panel 441. For instance, when the aspect ratio (ratio of horizontal and vertical dimensions) of the liquid crystal panels 441 is 4:3, the aspect ratio of the respective lenses is also set as 4:3.

The second lens array 413 has approximately the same arrangement as the first lens array 412, where the small lenses are disposed in matrix. The second lens array 413 as well as the superposing lens 415 focuses the image from the respective small lenses of the first lens array 412 onto the liquid crystal panel 441.

The polarization converter 414 is disposed between the second lens array 413 and the superposing lens 415 and is integrated with the second lens array 413 as a unit. The polarization converter 414 converts the light from the second lens array 413 to a single polarized light in order to enhance light utilization efficiency in the optical device 44.

Specifically, the respective sub-beams converted into single polarized light by the polarization converter 414 are substantially superposed on the liquid crystal panel 441 of the optical device 44 by superposing lens 415. Since the projector 1 using the liquid crystal panel 441 for modulating polarized light can use only single polarized light, approximately half of the light from the light source lamp 416 emitting other random polarized light cannot be used. Accordingly, by using the polarization converter 414, all of the light emitted from the light source lamp 416 is converted into single polarized light to enhance light utilization efficiency in the optical device 44.

Incidentally, such polarization converter 414 is disclosed in, for instance, Japanese Patent Laid-Open publication No. Hei 8-304739.

The color separating optical system has two dichroic mirrors 421 and 422 and a reflection mirror 423, the dichroic mirrors 421 and 422 separating the plurality of sub-beams irradiated by the integrator illuminating optical system 41 into three color lights of red (R), green (G) and blue (B).

The relay optical system 43 has incident-side lens 431, a relay lens 43 and reflection mirrors 432 and 434, and introduces the red color light separated by the color separating optical system 42 onto the liquid crystal panel 441R.

At this time, the red light component and the green light component of the light beam irradiated from the illuminating optical integrator system 41 are transmitted through the dichroic mirror 421 of the color separating optical system 42 and the blue light component is reflected by the dichroic mirror 421. The blue light reflected by the dichroic mirror 421 is reflected by the reflection mirror 423, which reaches to the liquid crystal panel 441B for blue-color through a field lens 418. The field lens 418 converts the respective sub-beams emitted from the second lens array 413 into a light beam parallel to central axis (main beam) thereof. The field lenses 418 provided in front of the other liquid crystal panels 441G and 441B function in the same manner.

In the red light and the green light transmitted through the dichroic mirror 421, the green light is reflected by the dichroic mirror 422 to reach the liquid crystal panel 441G for green color through the field lens 418. On the other hand, the red color transmits through the dichroic mirror 422 to pass the relay optical system 43 and reach the liquid crystal panel 441R for red color through the field lens 418.

Incidentally, the relay optical system 43 is used for the red color light in order to prevent decrease in utilization efficiency of light on account of light diffusion caused by longer length of the optical path of the red light than the length of the optical path of the other color lights, in other words, in order to directly transmit the sub-beam incident on the incident-side lens 431 to the field lens 418.

The optical device 44 is for modulating the incident light beam in accordance with image information to form a color image, which has three incident-side polarization plates 442, the liquid crystal panels 441R, 441G and 441B disposed on the after-stage of the respective incident-side polarization plates 442 as optical modulators, an irradiation-side polarization plate 443 disposed on the after-stage of the respective incident-side polarization plates 442, and a cross dichroic prism 444 as a color combining optical system.

The liquid crystal panels 441R, 441G and 441B use, for instance, a polysilicon TFT as a switching element.

In the optical device 44, the color lights separated by the color-separating optical system 42 are modulated by the three crystal panels 441R, 441G and 441B, the incident-side polarization plate 442 and the irradiation-side polarization plate 443 in accordance with image information to form an optical image.

The incident-side polarization plate 442 transmits only a polarized light of a predetermined direction among the respective color lights separated by the color separating optical system and absorbs the other light beam, which is constructed by forming a polarization film on a substrate of sapphire glass etc.

The irradiation-side polarization plate 443 is constructed in an approximately the same manner as the incident-side polarization plate 442, which transmits only a polarized light of a predetermined direction among the light beam irradiated by the liquid crystal panels 441 (441R, 441G and 441B) and absorbs the other light beam.

The polarization axes of the incident-side polarization plate 442 and the irradiation-side polarization plate 443 are set orthogonal with each other.

The cross dichroic prism 444 combines the optical image irradiated by the irradiation-side polarization plate 443 and modulated for respective color lights to form a color image.

A dielectric multi-layer film for reflecting red color light and a dielectric multi-layer film for reflecting blue color light are formed along boundary of four right-angled prisms of the cross dichroic prism 444, the dielectric multi-layer films combining three color lights.

The above-described liquid crystal panels 441, the irradiation-side polarization plate 443 and the cross dichroic prism 444 are constructed as an integrated unit of optical device body 45. Incidentally, the incident-side polarization plate 442 is slidably fitted and attached to a groove (not shown) formed on the light guide 47.

Figure 8:
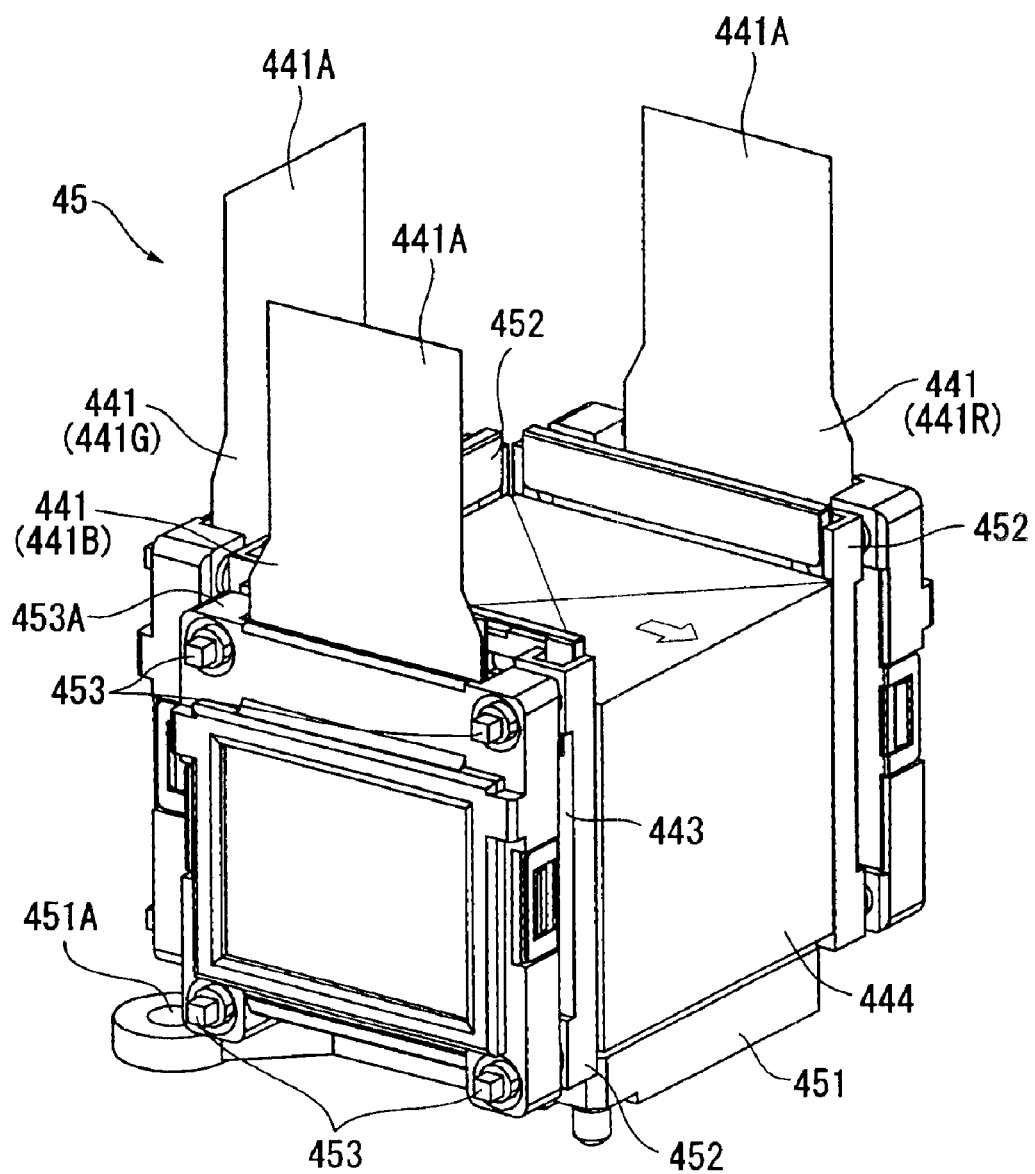
FIG. 8 is a perspective view showing an optical device integrating a liquid crystal panel and a prism seen from above according to the aforesaid embodiment.

FIG. 8 is a perspective view showing the optical device body 45.

As shown in FIG. 8, the optical device body 45 has the cross dichroic prism 444, a metal base 451 for supporting the cross dichroic prism 444 from the lower side, a metal holding plate 452 for holding the incident-side polarization plate 443 attached to the light-beam incident end of the cross dichroic prism 444, and liquid crystal panels 441 (441R, 441G and 441B) held by four pins 453 attached to the light-beam-incident side of the holding plate 452. A predetermined gap is secured between the holding plate 452 and the liquid crystal panel 441, so that the cooling air is flowed through the gap.

As shown in FIG. 7, the projection lens 46 enlarges and projects the color image combined by the cross dichroic prism 444 of the optical device 44.

The above-described optical systems 41 to 44 are accommodated in the light guide 47 made of synthetic resin as an optical component casing as shown in FIG. 6.

Though not specific illustration of the inside of the light guide 47 is omitted, as shown in FIG. 6, the light guide 47 has a lower light guide 471 having the groove for the respective optical components 412 to 415, 418, 421 to 423, 431 to 434 and 442 shown in FIG. 7 to be slidably fitted from the above, and a lid-shaped lower light guide 472 for closing the upper opening side of the lower light guide 471.

Further, as shown in FIG. 6, the light source 411 is accommodated on an end of the light guide 47 of approximately planarly-viewed L-shape, and the projection lens 46 is screwed and fixed on the other end through a head 49.

[3. Structure of Control Board]

As shown in FIG. 4, the control board 5 is located above the optical unit 4 and the power source unit 3 in a superposing manner, and is provided with connectors 5A as an interface with external device.

Various terminals such as RGB input terminal for inputting component signal, video/S-video input terminal, USB terminal and audio input terminal are provided as the connectors 5A for viewing visual presentation by personal computer data, and various image source such as DVD, video, video camera etc.

An image signal processing circuit as a controller for processing image signal and sound signal from the connector 5A is formed on the upper side of the control board 5, where circuit elements such as CPU and memory are installed.

A smoothing circuit for regulating and smoothing the electric current supplied by the power source block 31 of the power source unit 3 is formed, on which a capacitor, a choke coil etc. are installed.

A hole 5B is provided on the upper and lower sides of the control board 5 penetrating a portion corresponding to the respective liquid crystal panels 441. Switching element, picture element electrode and flexible print board 441A (FIGS. 6 and 8) electrically connected with opposing electrode of an opposing board are inserted to the hole 5B for transmitting the image signal outputted from the image signal processor to the respective liquid crystal panels 441. Accordingly, a connector for connecting the flexible print board 441A and the control board 5 is disposed around the hole 5B.

[4. Shield Structure of Power Source Unit]

The power source unit 3 is disposed in a space surrounded by the optical unit 4 of planarly-viewed L-shape and the exhaust duct unit 6 closely located to a side of the exterior case 2 as shown in FIG. 5, where the power source block 31, the light source driving block 32 and the control board 5 are superposed.

Figure 9:
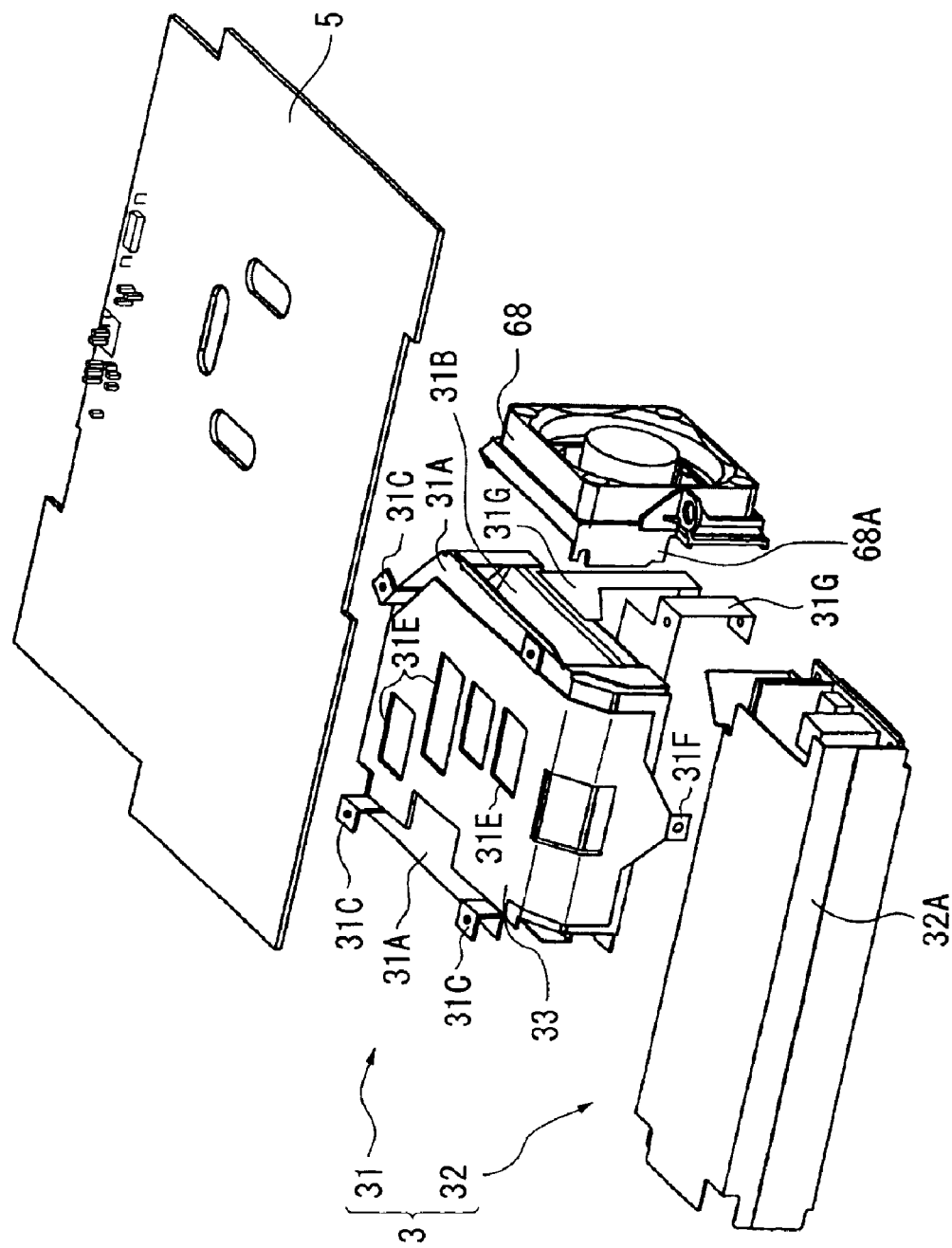
FIG. 9 is an exploded perspective view showing a power source unit according to the aforesaid embodiment.

As shown in FIG. 9, the power source block 31 supplies electric power to the light source driving block 32, the control board 5 etc., which has a power source board 31B having a not-illustrated transformer, a converter for converting an output from the transformer into a predetermined voltage for supplying great electric current with lower voltage to the CPU etc. installed on the control board 5.

The circumference of the power source board 31B is surrounded by the case member 31A having opened right and left sides of which surface is processed by plating, metal vacuum evaporation and foliation in order to prevent leakage of electromagnetic noise from the installed circuit component toward the outside, and the metal lower shield 33 having rectangular opening, the components blocking electromagnetic noise toward the control board 5 and the light source driving block 32.

The lower shield 33 has support portions 31C projecting from the respective corners of the upper side thereof for supporting the control board 5 disposed above the power source block 31.

Further, a plurality of holes 31E are formed for preventing the heat from residing in the inside, the plurality of holes 31E radiating the heat generated on the case member 31A heated by a heating elements installed on the power source board 31B.

On the bottom side of the lower shield 33, a case fixing portion 31G projecting from the opening on the side of the projection lens 46 at the bottom side toward downside for fixing to the lower case 22 is formed.

On the front side of the lower shield 33, a lamp driving circuit fixing portion 31F extending from the front side toward downside to be connected to the light source driving block 32 for integrating the power source block 31 and the light source driving block 32 is formed.

The light source driving block 32 is installed with a transformer for transforming the voltage from the power source block 31 to a predetermined voltage, a capacitor for storing the electric power, resistor etc. on a board thereof, which is covered with the case member 32A as in the power source board 31B. The case member 32A blocks the electromagnetic noise from the circuit component installed on the light source driving block 32 to prevent leakage of the electromagnetic noise toward the power source block 31, the control board 5 and the outside of the projector 1.

A hole (not shown) is formed on the board of the light source driving block 32 corresponding to the lamp driving circuit fixing portion 31F, through which the light source driving block 32 and the power source block 31 are integrated by screwing.

An axial fan 68 is disposed spanning over the opening of the case members 31A and 32A on the side of the projection lens 46, the axial-flow fan 68 cooling both of the power source block 31 and the light source driving block 32.

A peripheral end of the case members 31A and 32A of the axial-flow fan 68 is covered with an insulative duct 68A for securing airflow toward the case members 31A and 32A.

The air-flow rate of the axial-flow fan 68 is set less than the air-flow rate of the axial-flow fan 6A of the exhaust duct unit 6, so that the air transferred from the axial-flow fan 68 is drawn to the axial-flow fan 6A of the exhaust duct unit 6.

[5. Cooling Structure]

The projector 1 has a panel cooling system A for mainly cooling the liquid crystal panel 441, a light source cooling system B for mainly cooling the light source 411 and a power source cooling system C for mainly cooling the power source unit 3.

Figure 10:
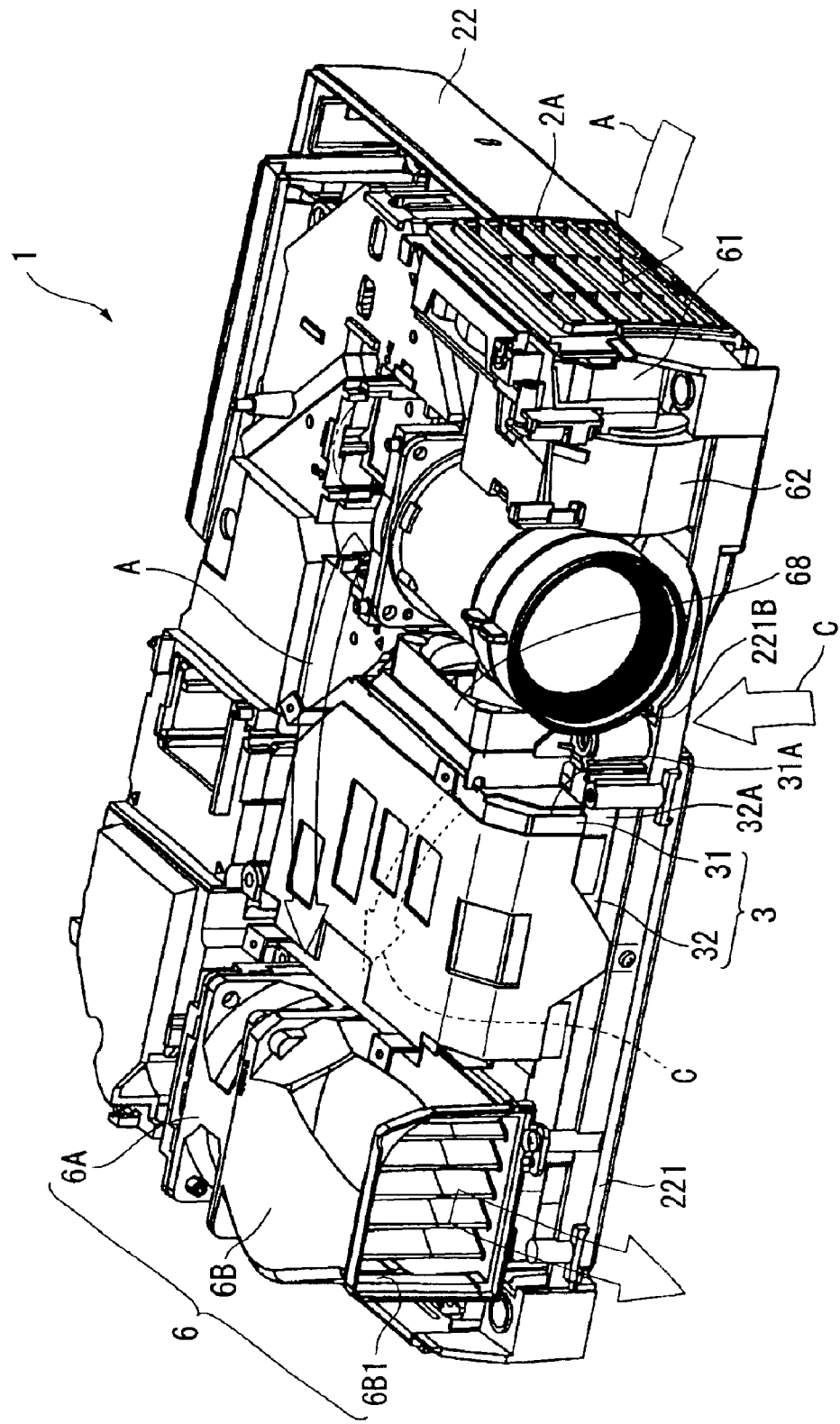
FIG. 10 is an illustration showing a flow of cooling air of a panel cooling system A and a power source cooling system C according to the aforesaid embodiment.
Figure 11:
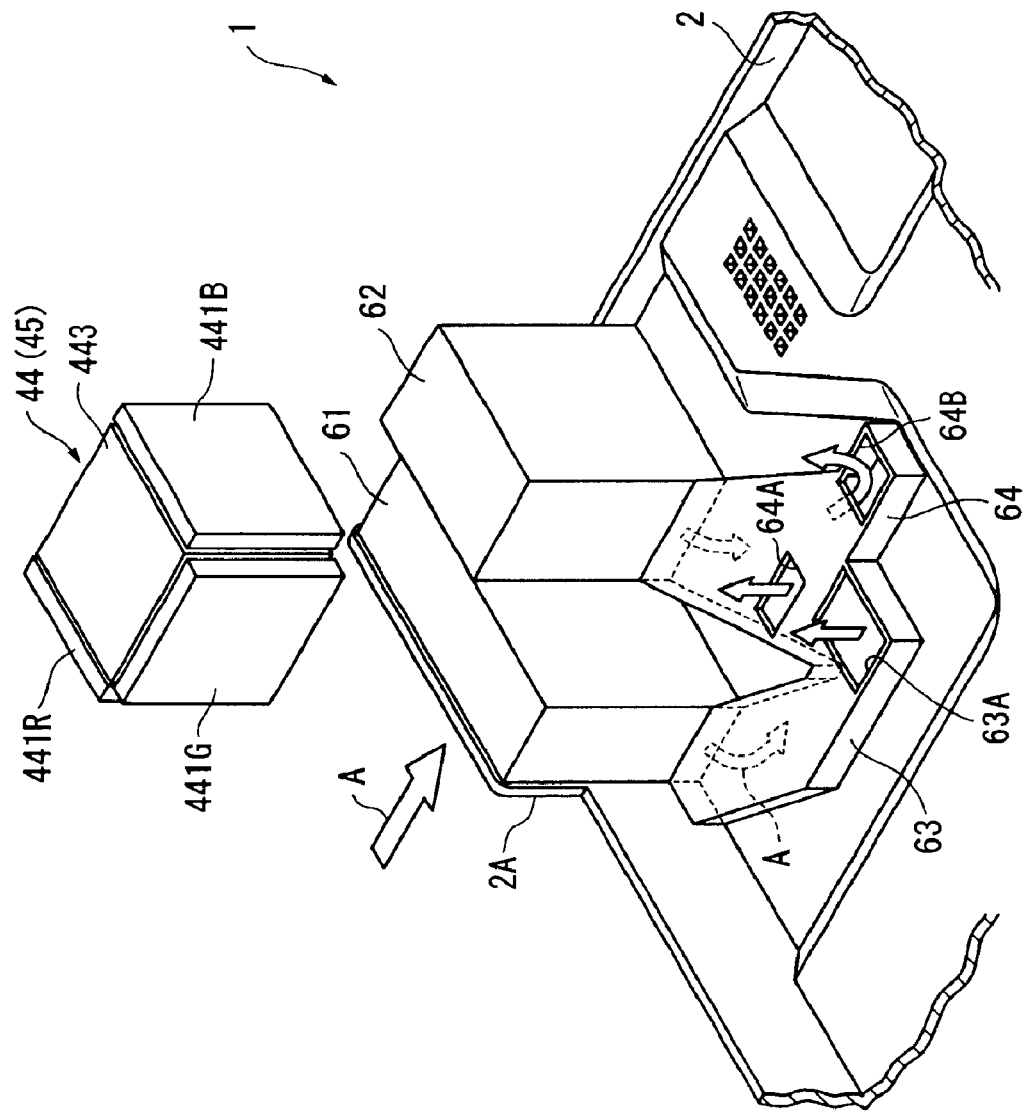
FIG. 11 is an illustration showing a flow of cooling air of a panel cooling system A according to the aforesaid embodiment.
Figure 12:
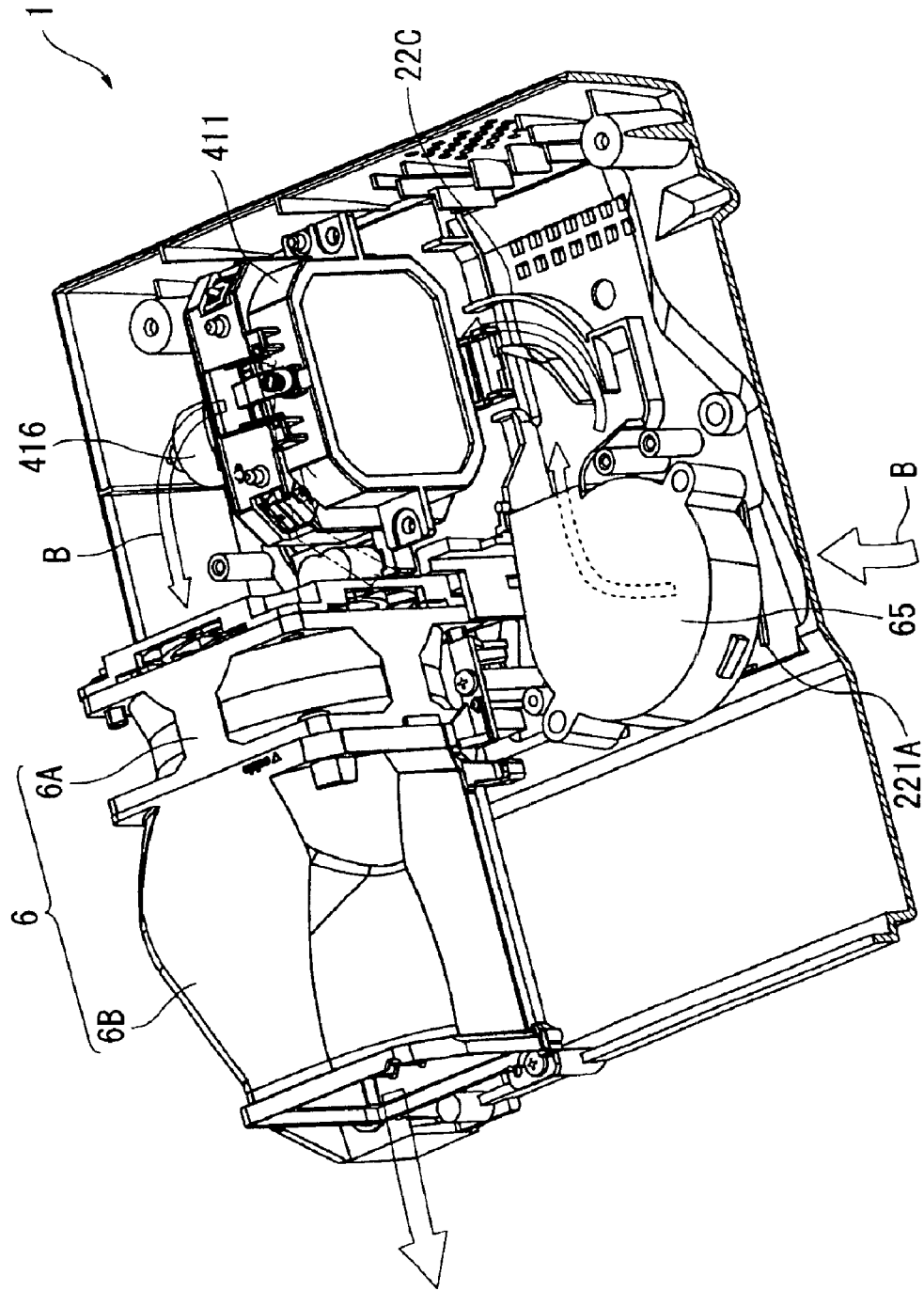
FIG. 12 is an illustration showing a flow of cooling air of a light source cooling system B according to the aforesaid embodiment.

FIG. 10 is an illustration identical with FIG. 5 adding arrows indicating airflow of the cooling air, which shows the flow of the cooling air inside the projector 1 including the power source cooling system C. FIG. 11 is a perspective view schematically showing the structure of the lower side of the optical device 44 for explaining the panel cooling system A. FIG. 12 is a perspective view showing the structure on the lower side of the power source unit 3 and the light guide 47 for explaining the light source cooling system B.

In FIG. 10, two sirocco fans 61 and 62 are disposed on the right side of the projection lens 46 in the panel cooling system A. Further, as shown in FIG. 12, ducts 63 and 64 respectively connected to the fans 61 and 62 are used in the panel cooing system A.

As shown in FIG. 11, the sirocco fans 61 and 62 inhale outside cooling air from the inlet hole 2A on a side of the exterior case 2 and discharge the inhaled cooling air to the ducts 63 and 64 respectively. Incidentally, the size of the sirocco fan 62 is greater than the sirocco fan 61.

The duct 63 guides the cooling air discharged by the sirocco fan 61 toward lower side of the optical device 44, where a rectangular opening 63A is formed at a position corresponding to the lower side of the liquid crystal panel 441G for green color light.

The duct 64 guides the cooling air discharged by the sirocco fan 62 to the lower side of the optical device 44, where rectangular openings 64A and 64B are respectively formed at a position corresponding to the lower side of the liquid crystal panels 441R and 441B respectively for red color light and blue color light.

Though not shown, an opening is formed on the bottom side of the lower light guide at a position corresponding to the openings 63A, 64A and 64B.

Accordingly, as shown in FIG. 11, the cooling air inhaled by the sirocco fans 61 and 62 of the panel cooling system A flows to cool the incident-side polarization plate and the irradiation-side polarization plate which is not illustrated in FIG. 11, in addition to the respective liquid crystal panels 441R, 441G and 441B.

Further, as shown in FIG. 10, the cooling air which has cooled the liquid crystal panels 441R, 441G and 441B upwardly from the lower side is drawn to the side of the axial-flow fan 6A on the left side viewed from the front side while cooling the lower side of the circuit board (not shown in FIG. 10) and is discharged from the exhaust hole on the front side of the exterior case (not shown in FIG. 10).

In FIG. 12, a sirocco fan 65 provided on the lower side of the power source unit 3, the axial-flow fan 6A and the exhaust duct 6B attached to the axial-flow fan 6A are used in the light source cooling system B.

The cooling air inhaled from the inlet hole 221A of the lower case 22 by the sirocco fan 65 flows along a guide 22C formed on the inner side of the bottom portion 221 of the lower case 22 and, thereafter, enters in the light source 411 to cool the light source lamp 416 to be flowed out toward the outside of the light source 411. The cooling air flowed out of the light source 411 is drawn by the axial-flow fan 6A in the same manner as the panel cooling system A to be discharged from the exhaust hole on the front side of the exterior case (not shown in FIG. 12) through the exhaust duct 6B.

In FIG. 10, an axial-flow fan 68 provided on the right side of the power source unit 3 is used in the power source cooling system C.

The cooling air inhaled by the axial-flow fan 68 from the inlet hole 221B formed on the bottom portion 221 of the lower case 22 flows from the right side to the left side viewed from the front side along the case members 31A and 32A while cooling the power source block 31 and the light source driving block 32. Subsequently, most of the cooling air is drawn by the axial-flow fan 6A as in the other cooling system A and B and is discharged from the not-illustrated exhaust hole on the front side of the exterior case. Incidentally, a part of the air is directly discharged from the exhaust hole of the exterior case without being drawn by the axial-flow fan 6A.

[6. Advantage of Embodiment]

According to the above-described embodiment, following advantages can be obtained.

(1) Since the control board 5, the power source block 31 and the light source driving block 32 are integrated by the support portion 31C of the case member 31A and the light source driving block fixing portion 31F of the case member 31A and since the power source block 31 and the light source driving block 32 are disposed in a space defined by the optical unit 4 of approximately planarly-viewed L-shape and the exhaust duct unit 6, the component constituting the projector 1 can be highly densely installed, thereby effectively utilizing the space inside the projector 1 and enabling size reduction of the projector 1.

(2) Since the circumference of the power source block 31 and the light source driving block 32 are covered with the case members 31A and 32A and the lower shield 33, the electromagnetic noise radiated by the power source block 31 and the light source driving block 32 does not influence on the image signal processing circuit and the smoothing circuit installed on the control board 5, thereby achieving stable image having no disturbance on the projected image.

(3) Since the upper shield 34 is provided on the upper side of the control board 5, even when the electromagnetic noise radiated by the power source block 31 and the light source driving block 32 is leaked through the case members 31A and 32A and the lower shield 33, the electromagnetic noise can be blocked by the upper shield 34, thereby preventing leakage of the electromagnetic noise toward the outside of the projector 1, so that electromagnetic interference can be well avoided.

(4) Since the support portion 31C and the light source driving block fixing portion 31F are formed on the case member 31A, the control board 5, the power source block 31 and the light source driving block 32 can be integrated and the shield structure can be simplified, thereby reducing the size of the projector 1.

(5) Since the power source block 31 is interposed between the control board 5 and the light source driving block 32, the electromagnetic noise radiated by the light source driving block 32 can be blocked by the light source driving block 3, the electromagnetic noise radiated by the light source driving block 32 is not received by the control board 5, thereby avoiding disturbance of projected image and malfunction.

(6) Since the connector 5A to be connected with external device is provided to the control board 5, the interface board installed with a circuit for processing the inputted image signal etc. becomes unnecessary, thereby omitting components in the projector 1 to enhance size reduction of the projector 1.

(7) Since the connector 5A to be connected with external device is provided on the rear end of the control board 5 and the power source unit 3 is disposed on the front side of the control board 5, the connector 5A which is easily influenced by electromagnetic noise and likely to work as an antenna can be spaced apart from the power source unit which radiates the electromagnetic noise, the electromagnetic noise from the power source unit 3 can be prevented from being mixed in the inputted image signal and sound signal etc., thereby keeping vivid image and sound and achieving a stable image.

(8) Since the light source driving block 32 is accommodated in the case member 32A, the electromagnetic noise radiated by the light source driving block 32 can be prevented from leaking toward the lower side of the light source driving block 32, thereby preventing leakage of the electromagnetic noise toward the outside of the projector 1. Accordingly, electromagnetic interference on the other electronics on the outside of the projector 1 can be well prevented.

(9) Since the case members 31A and 32A are case-shaped and the axial-flow fan 68 is located on one of the openings thereof, the power source block 31 and the light source driving block 32 accommodated in the case members 31A and 32A can be efficiently cooled, thereby preventing deterioration of the power source block 31 and the light source driving block 32.

(10) Since the duct 68A is formed on the periphery of the exhaust surface of the axial-flow fan 68, the cooling air from the axial-flow fan 68 can be regulated and the cooling air can be effectively introduced to the inside of the case members 31A and 32A, thereby improving the cooling efficiency of the power source block 31 and the light source driving block 32.

(11) Since the hole 31E is formed on the lower shield 33, the heat of the case member 31A heated by the heating element of the power source board 31B can be radiated, thereby efficiently cooling the power source block 31.

[7. Modification of Embodiment]

Incidentally, the scope of the present invention is not restricted to the above embodiment, but includes other arrangement as long as an object of the present invention can be achieved, which includes following modifications.

Though a projector using three optical modulators is taken as an example in the above-described embodiment, the present invention can be applied to a projector having a single, two, or more than three optical modulators.

Though the liquid crystal panel is used as the optical modulator, an optical modulator other than liquid crystal such as a device using a micro-mirror may be used.

Though a transmission-type optical modulator having different light-incident side and light-irradiation side is used in the above-described embodiment, a reflection-type optical modulator having common light-incident side and light-irradiation side may be used.

Though a front-type projector where the image is projected from a direction for viewing the screen is taken as an example in the above-described embodiment, the present invention may be applied to a rear-type projector where the image is projected from a direction opposite to the direction for viewing the screen.

What is claimed is:

1. A projector comprising:
    an electric optical device that modulates a light beam irradiated by a light source in accordance with image information;
    a light source driving block that drives the light source;
    a control block that controls the electric optical device; and
    a power source block that supplies electric power to the light source driving block and the control block,
    wherein the power source block is physically sandwiched between the control block and the light source driving block.

2. The projector according to claim 1, wherein the control block, the power source block and the light source driving block are superposed in thickness direction of the projector.

3. The projector according to claim 1,
    wherein the control block is a rectangular plate-shaped control board,
    wherein the light source driving block is disposed at a first end of the control board and an input signal terminal for the image information to be inputted is provided on a second end of the control board opposite to the first end.

4. The projector according to claim 1, further comprising a metal shield frame that supports and space out the control block, the power source block and the light source driving block.

5. The projector according to claim 1, the light source driving block further comprising a tube-shaped shield member that covers a circuit element of the light source driving block.

* * * * *